United States Patent
Chua et al.

(10) Patent No.: US 10,132,025 B2
(45) Date of Patent: Nov. 20, 2018

(54) STEAMER WITH FILTER UNIT, FILTER CARTRIDGE AND METHOD OF CONVEYING STEAM

(71) Applicant: KONINKLIJKE PHILIPS N.V., Eindhoven (NL)

(72) Inventors: Hee Keng Chua, Eindhoven (NL); Boon Khian Ching, Eindhoven (NL); Yong Jiang, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/916,246

(22) PCT Filed: Aug. 25, 2014

(86) PCT No.: PCT/IB2014/064043
§ 371 (c)(1),
(2) Date: Mar. 3, 2016

(87) PCT Pub. No.: WO2015/033247
PCT Pub. Date: Mar. 12, 2015

(65) Prior Publication Data
US 2016/0201255 A1    Jul. 14, 2016

(30) Foreign Application Priority Data

Sep. 6, 2013  (EP) .................................... 13183269

(51) Int. Cl.
*D06F 75/10*    (2006.01)
*D06F 75/20*    (2006.01)
(Continued)

(52) U.S. Cl.
CPC ............ *D06F 75/10* (2013.01); *B01D 46/00* (2013.01); *B01D 46/0002* (2013.01);
(Continued)

(58) Field of Classification Search
CPC . D06F 75/08–75/22; C02F 1/00; C02F 1/001; C02F 2103/02; C02F 2201/008;
(Continued)

(56) References Cited

U.S. PATENT DOCUMENTS 1,593,897 A  *  7/1926  Brewer ................... D06F 75/12
                                                          38/77.6
1,799,281 A  *  4/1931  Cissell .................... D06F 75/12
                                                          236/7
(Continued)

FOREIGN PATENT DOCUMENTS

CN    201546084 U    8/2010
CN    201933337 U    8/2011
(Continued)

*Primary Examiner* — Ismael Izaguirre

(57) ABSTRACT

The present application relates to a steamer which has a steam generator (11) with a steam outlet (33). A steam path extends from the steam outlet to convey steam, and a filter unit (7) is positioned in the steam path. The filter unit has a filter cartridge (24) removably mounted along the steam path having a cartridge housing, a filter medium received in the cartridge housing. The filter unit also has a cartridge inlet and a cartridge outlet which are at or towards a first end (32) of the cartridge housing (34), and a barrier (20) configured to guide the steam to flow in the cartridge housing to a second end (17). The filter unit is spaced from the steam outlet (33), to filter impurities from steam passing along the steam path. The present application also relates to a filter cartridge for a steamer.

13 Claims, 4 Drawing Sheets

(51) Int. Cl.
*B01D 46/00* (2006.01)
*F22B 1/28* (2006.01)
*C02F 1/00* (2006.01)
*C02F 103/02* (2006.01)

(52) U.S. Cl.
CPC .......... *B01D 46/0041* (2013.01); *C02F 1/001* (2013.01); *D06F 75/20* (2013.01); *F22B 1/28* (2013.01); *F22B 1/282* (2013.01); *F22B 1/284* (2013.01); *C02F 2103/02* (2013.01); *C02F 2201/008* (2013.01)

(58) Field of Classification Search
CPC ................ B01D 46/00; B01D 46/0041; B01D 46/0002; B01D 46/0008; B01D 46/0012; F22B 1/28; F22B 1/282; F22B 1/284
See application file for complete search history.

(56) References Cited

U.S. PATENT DOCUMENTS

| | | | | |
|---|---|---|---|---|
| 2,027,767 A | * | 1/1936 | Deems | D06F 75/16 38/77.8 |
| 2,190,904 A | * | 2/1940 | Wiggins | D06F 75/14 239/136 |
| 2,322,103 A | * | 6/1943 | Altman | D06F 75/16 38/77.82 |
| 2,343,555 A | * | 3/1944 | Huffman | D06F 75/16 38/77.82 |
| 2,365,332 A | * | 12/1944 | Cissell | D06F 75/10 38/77.6 |
| 3,337,975 A | * | 8/1967 | Young | D06F 75/14 38/77.2 |
| 4,087,263 A | | 5/1978 | Schonmann, Jr. | |
| 5,246,572 A | | 9/1993 | Guillot | |
| 6,212,332 B1 | | 4/2001 | Sham | |

FOREIGN PATENT DOCUMENTS

| | | |
|---|---|---|
| CN | 102268812 A | 12/2011 |
| DE | 102004032361 A1 | 8/2005 |
| EP | 0554549 A1 | 8/1993 |
| EP | 0711862 A1 | 5/1996 |
| WO | 2008075308 A2 | 6/2008 |
| WO | 2010139599 A2 | 12/2010 |
| WO | 2013068870 A1 | 5/2013 |

* cited by examiner

STEAMER WITH FILTER UNIT, FILTER CARTRIDGE AND METHOD OF CONVEYING STEAM

This application is the U.S. National Phase application under 35 U.S.C. § 371 of International Application No. PCT/M2014/064043, filed on Aug. 25, 2014, which claims the benefit of International Application No. 13183269.3 filed on Sep. 6, 2013. These applications are hereby incorporated by reference herein.

FIELD OF THE INVENTION

This invention relates to a steamer having a filter unit to remove impurities from the steam. The invention also relates to a filter cartridge for a steamer. The invention is particularly useful for pressurized steamers to treat fabrics.

BACKGROUND OF THE INVENTION

Many devices use steam to treat garments and other objects to remove wrinkles, for cleaning or for other purposes. For example, a steam iron discharges steam from a soleplate onto a fabric of a garment to help remove wrinkles. In another embodiment, a steam cleaner may comprise a hose with a steam applicator that a user moves to direct steam onto fabrics, such as curtains or upholstery. Typically these devices comprise a boiler that heats and evaporates water to produce the required steam, which is conveyed to some means of applying the steam to an article. Scale forms when water is evaporated to produce steam and impurities and other substances which were dissolved in the water are left behind and form solid compounds. This is particularly common in areas where the mains water supply is hard water, i.e. it contains a relatively high level of impurities such as calcium and magnesium.

Furthermore, if a boiler is not regularly rinsed and cleaned then the water that remains in the boiler can become contaminated. This is a result of the scale and other impurities which remain in the boiler as solids or dissolved in unevaporated water. Therefore, over time, water in a boiler will become progressively more contaminated with impurities, and a foam substance may be produced.

The impurities and foam may be carried by the contaminated steam and may mark, stain and possibly damage any garment or other article which is being treated, as well as cause blockages in other parts of the device.

WO2008/075308A2 discloses a steam generator with a filter at the outlet of the boiler that removes impurities from steam. However, the end of the filter may become blocked by impurities and foam, which will reduce the possible steam flow rate through the filter.

SUMMARY OF THE INVENTION

It is an object of the invention to provide a steamer which substantially alleviates or overcomes problems mentioned above. The invention is defined by the independent claims. The dependent claims define advantageous embodiments.

According to the present invention, there is provided a steamer comprising a steam generator with a steam outlet, a steam path extending from the steam outlet to convey steam, and a filter unit in the steam path, the filter unit comprising a filter cartridge removably mounted along the steam path having a cartridge housing, a filter medium received in the cartridge housing, a cartridge inlet and a cartridge outlet which are at or towards a first end of the cartridge housing, and a barrier configured to guide the steam to flow in the cartridge housing to a second end, the filter unit being spaced from the steam outlet to filter impurities from steam passing along the steam path.

The filter unit will remove impurities from the steam which will prevent contaminated steam from being imparted on objects, e.g. fabrics, such as garments, that are being treated by the steamer. Moreover, the filter unit is spaced from the steam outlet of the steam generator, and so the filter unit will not be subjected to the heat and large particles of scale that exist in the boiler. The spacing between the steam outlet and the filter unit will improve the longevity and performance of the filter. Furthermore, only relatively small impurities are carried in the steam and foam to the filter unit in the steam path and these relatively small impurities can easily be filtered out to prevent the impurities from reaching the fabric being steamed.

By the filter unit comprising a filter cartridge removably mounted along the steam path, the removable filter cartridge can be easily changed or cleaned as necessary to maintain performance of the filter unit.

The cartridge mount may be attached to the steam path, with the removable filter cartridge being attachable to the cartridge mount. This makes it simple to change the filter cartridge as the part of the steam path that the filter unit is attached to does not have to be disassembled to change the filter cartridge.

By removing the filter cartridge a user will also remove the filter medium, which can be cleaned to remove accumulated impurities, or it can be replaced. In this way the performance of the filter unit can be maintained.

By positioning the inlet and outlet at a first end of the cartridge housing the cartridge can more easily be connected to the cartridge mount as only one sealing and fixing point is required. Moreover, the flow of the steam from the first end, to the second end, and back to the outlet at the first end will mean that the steam can be better filtered within the filter cartridge.

The filter medium may be disposed between the first end and the second end of the cartridge housing. Therefore, as the steam flows from the first end to the second end and/or as the steam flows from the second end to the first end, the steam will pass through the filter medium and impurities will be removed.

The barrier may be a tube extending in the cartridge housing which is configured to fluidly connect the cartridge inlet or cartridge outlet with the second end of the cartridge housing. In this way, the steam flows through the tube from one end of the cartridge to the other and the filter cartridge is divided into two paths: a first path where the steam flows through the tube; and, a second part where the steam flows through the space around the tube. In this way, steam that flows to the second end of the cartridge housing can then flow into the tube, or steam that flows along the tube to the second end of the cartridge housing can then flow through the space around the tube.

The tube may extend through the filter medium. Therefore, the filter medium is positioned in the space within the cartridge housing which surrounds the tube, and that means that the cross-sectional area of the filter medium is greater than the cross-sectional area of the tube. Therefore, the steam flowing through the filter medium will have reduced pressure and/or fluid flow speed compared to the steam flowing through the tube. This means that the filter medium can filter out more impurities, is less likely to become blocked by an accumulation of impurities, and will experience less abrasion and wear.

The filter medium may be spaced from the cartridge inlet.

A pipe may connect the steam outlet with the filter unit.

The filter medium is preferably made from stainless steel fiber which is washable so can be reused and also has a high temperature tolerance. Alternatively, it may be made from plastic or plant fibers. The filter medium may be woven or non-woven. Alternately, open cell foam made from plastic polymer can be used as the filter medium. Filter medium made from plastic polymer should have a temperature resistance of at least 100° C.

The housing may be transparent or translucent. Therefore, a user will be able to see steam flowing through the filter unit and may also be able to see the filter medium. By monitoring the color of the filter medium and/or the color of the steam passing through the filter unit, the user is able to judge when the filter needs to be changed to maintain performance.

The steamer may further comprise a body, and the cartridge housing may be removably attachable to the body such that it extends from the body.

The body may be a casing or housing or a part of a base unit or steam iron or other apparatus and the cartridge housing may be attachable to that body so that it extends from the body and a user is able to see and grasp the filter cartridge to remove it, without having to disassemble any part of the steamer. In other words, the filter cartridge protrudes from a part of the steamer so that it is visible and easily accessible. Moreover, if the filter unit is transparent or translucent then the user is able to see the steam and/or filter medium within the filter unit during use and without having to move any parts.

The steamer may comprise a base unit and a head unit having one or more steam vents for supplying steam to a surface to be steamed. The boiler may be disposed in the base unit. Therefore, steam is provided by the boiler and the head unit is used to apply the steam to a fabric article. The steam vents form the final part of the steam path and steam exiting the head unit through the steam vents will have been filtered to remove impurities and foam to protect the fabric article.

The filter unit may be on the base unit. Alternatively, the filter unit may be on the head unit.

The head unit may be a steam iron having a soleplate comprising the one or more steam vents. In use, the soleplate is pressed against a fabric article, such as a garment, to remove wrinkles. Steam is provided to heat the garment and it also helps to remove wrinkles by providing humidity to loosen the fibers of the fabric. Steam that exits the steam vents through the soleplate and is imparted on the garment has been filtered by the filter unit and contains no, or very little, impurities. Therefore, the garment is not marked or stained by the steam.

According to another aspect of the invention, there is provided a filter cartridge for a steamer, the filter cartridge comprising a cartridge housing, a connector for mounting the filter cartridge along a steam path of said steamer, a filter medium in the cartridge housing to filter impurities from steam passing along said steam path, a cartridge inlet and a cartridge outlet which are at or towards a first end of the cartridge housing, and a barrier configured to guide the steam to flow in the cartridge housing to a second end.

The filter cartridge may be provided separately, as a replacement part, and can be attached to a part of a steam path of a pressurized fabric steamer so that impurities are removed from the steam as it flows along the steam path of the pressurized fabric steamer after leaving the steam generator.

According to another aspect of the invention, there is provided a method of conveying steam, the method comprising the steps of:

directing steam from a steam outlet and along a steam path to a filter cartridge removably mounted along the steam path having a cartridge housing, a filter medium received in the cartridge housing, a cartridge inlet and a cartridge outlet which are at or towards a first end of the cartridge housing; and filtering impurities from steam passing along the steam path at a location in the steam path that is spaced from the steam outlet, the steam being guided in the cartridge housing to flow in the cartridge housing to a second end.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
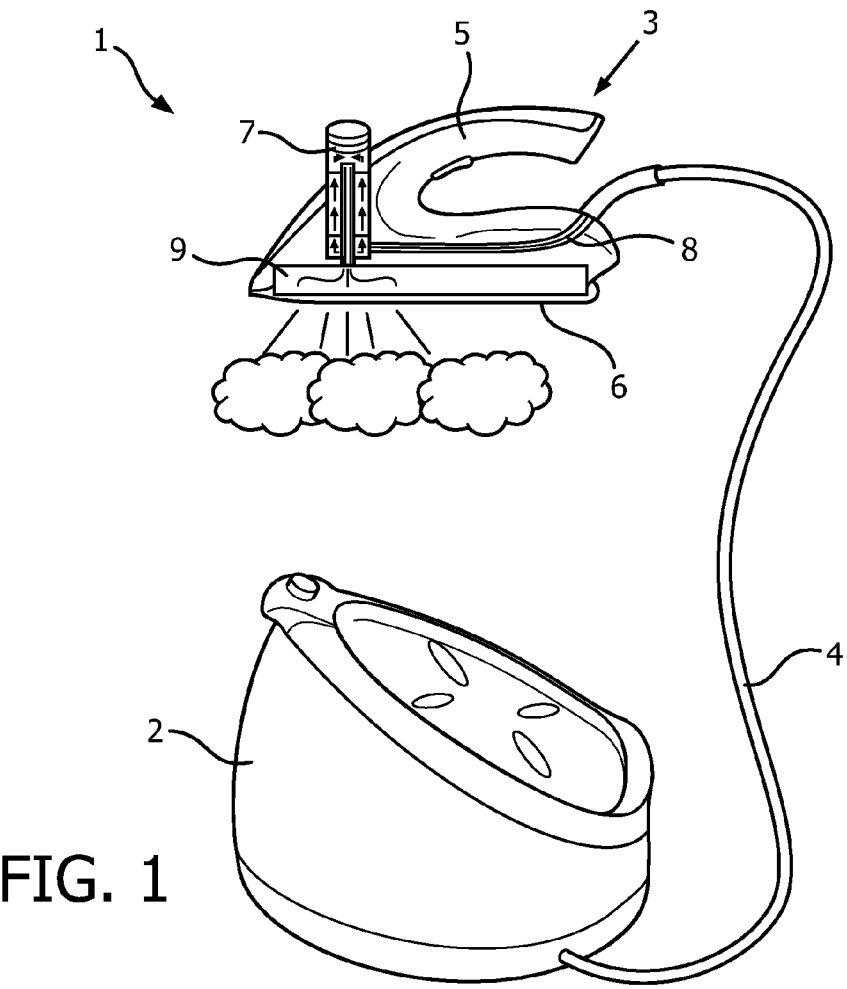
FIG. 1 shows a pressurized fabric steamer having a base unit and a steam iron.
Figure 4:
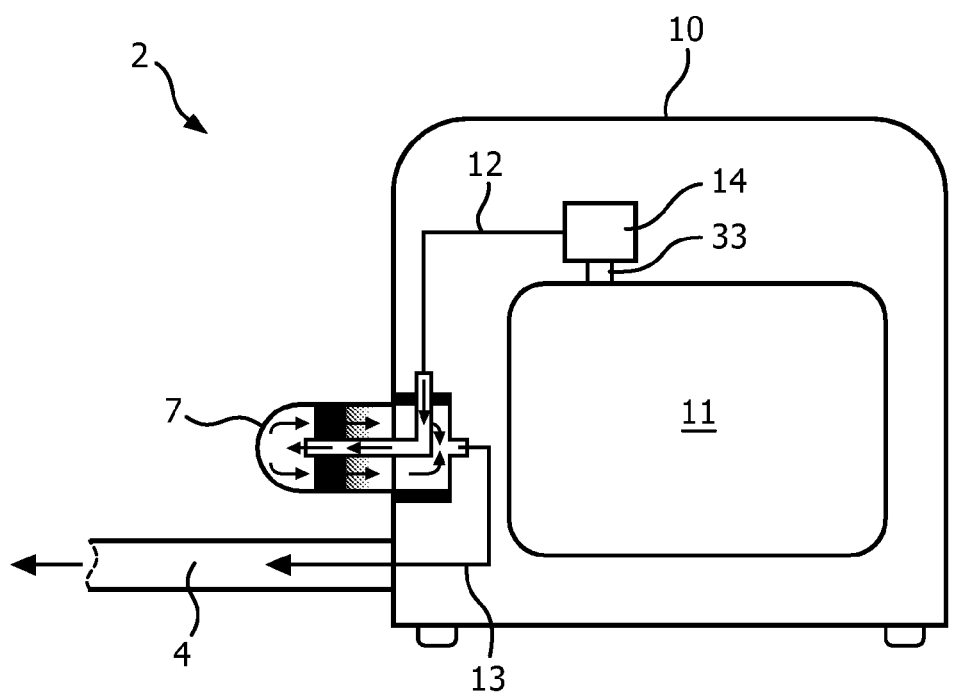
FIG. 4 shows a cross-section of the base unit of FIG. 3.

Steam may be generated by boiling a pool of water or by feeding water onto a heated surface. Either way, the evaporation occurs in a steam generator, e.g. a boiler and steam is then channeled out of the boiler to be used for the desired application. Water can be stored in a water storage tank and fed into the boiler as required. In one embodiment of a pressurized fabric steamer 1, as shown in FIG. 1, a base unit 2 is attached to a steam iron 3 acting as a head unit. The base unit 2 has a boiler 11 (as shown in FIG. 4) for heating and evaporating water and a water storage area. The base unit 2 is connected to the steam iron 3 via a hose 4 that conveys the steam to the steam iron 3. The steam iron 3 has a handle portion 5 and a soleplate 6 which is placed against a fabric of a garment to remove wrinkles from the fabric. The soleplate 6 is provided with one or more steam vents (not shown) that allow the steam to pass through the soleplate 6 and onto the fabric.

In this embodiment, the boiler 11 in the base unit 2 provides the steam iron 3 with pressurized steam. That is, the steam being conveyed along the hose 4 to the steam iron 3 is at a pressure above atmospheric pressure. The base unit 2 may comprise a pump or some other means of pressurizing the steam. In this way, a greater quantity of steam can be provided to the steam iron 3 and the steam is maintained at a higher temperature along the hose 4 and within the steam iron 3, which is desirable when using the steam iron 3.

A steam path is defined along which steam is conveyed from the boiler 11 to outside the pressurized fabric steamer.

The steam path is defined from a steam outlet to the one or more steam vents. The steam being conveyed along the steam path is under pressure and so the pressurized fabric steamer 1 may be provided with appropriate shut-off valves, safety pressure release valves, temperature and pressure sensors and any other relevant apparatus. The hose 4 and hose fittings, as well as any other portion of the steam path, should also be adequate for coping with the operating heat and pressure of the pressurized steam in the pressurized fabric steamer 1.

As shown in FIG. 1, the pressurized fabric steamer 1 is provided with a filter unit 7 disposed in the steam path. The filter unit 7 is attached to a part of the steam iron 3 and the steam path is configured to convey the steam through the filter unit 7 before it reaches the soleplate 6 and the steam vents. The filter unit 7 has a filter medium through which the steam passes to remove impurities, such as particles, flakes and any foam that has been conveyed along the steam path. After passing through the filter unit 7 the filtered steam flows to and passes through the steam vents of the soleplate 6 to be applied to a garment. As shown in FIG. 1, the steam path comprises a hose 4 that conveys steam from the boiler in the base unit 2 to the steam iron 3, a pipe 8 within the steam iron 3 that conveys steam from the end of the hose 4 to the filter unit 7, and a passage 9 that conveys steam from the filter unit 7 to the soleplate 6. The steam path also comprises a pipe (not shown) from the boiler 11 to the hose 4. In general, the filter unit 7 is disposed in the steam path, intermediate the boiler 11 and the soleplate 6, and in this case the filter unit 7 is attached to a part of the steam iron 3.

Figure 2:
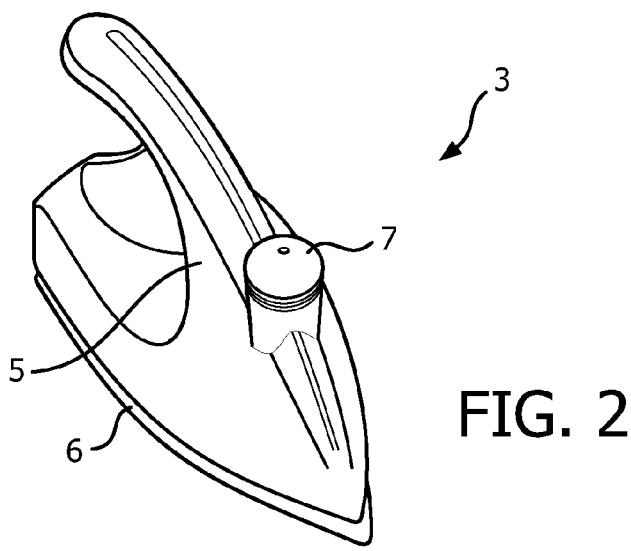
FIG. 2 shows the steam iron of FIG. 1.

FIG. 2 shows a view of the steam iron 3 of the pressurized fabric steamer 1 described with reference to FIG. 1. A user is able to grip the handle portion 5 to move the soleplate 6 over a garment laid on a flat surface. As shown, in this embodiment, the filter unit 7 is attached to the steam iron 3 on a front part of the handle portion 5, in line with the handle portion 5 and within the view of a user who is gripping the handle portion 5 and using the steam iron 3. However, it will be appreciated that the filter unit 7 may alternatively be attached to any other part of the steam iron 3.

Figure 3:
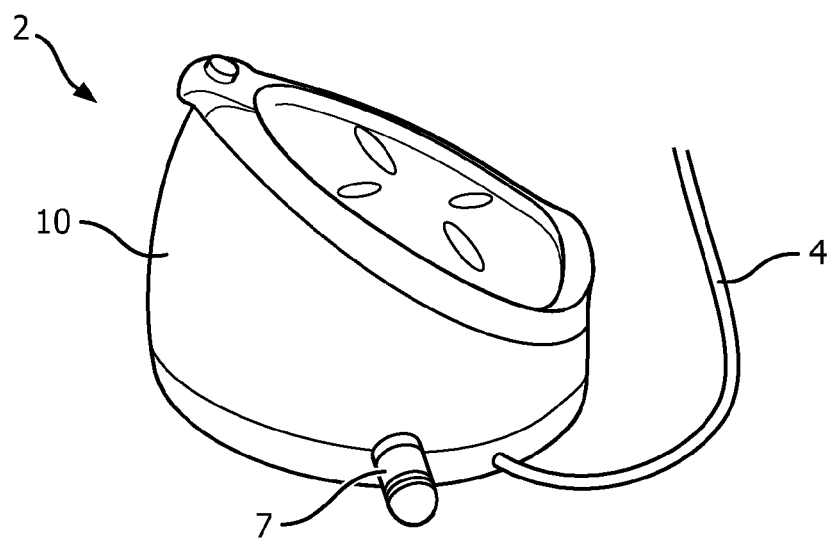
FIG. 3 shows a base unit.

FIGS. 3 and 4 show another embodiment of a pressurized fabric steamer with the filter unit 7 being attached to a part of the steam path. In this embodiment, the filter unit 7 is attached to a part of the base unit 2. In this embodiment, the base unit 2 comprises a body 10 within which the boiler 11 is housed. The hose 4 is connected to the base unit 2 so that steam from the boiler 11 in the base unit 2 is conveyed to the hose 4 and onwards to the steam iron (not shown).

As shown in FIG. 3, the filter unit 7 may be attached to a side of the body 10 of the base unit 2. Alternatively, the filter unit 7 may be attached to any part of the base unit 2.

FIG. 4 shows a cross-section of the base unit 2 with the boiler 11, the hose 4, the filter unit 7, and first and second pipes 12,13 that convey steam from the boiler 11 to the hose 4 via the filter unit 7. The filter unit 7 is disposed between the first pipe 12 and the second pipe 13 so that steam passes through the filter unit 7 prior to entering the hose 4. The steam leaves the boiler 11 through a steam outlet 33 and flows along the first pipe 12 to an inlet of the filter unit 7. In this embodiment, an electronic valve 14 is attached to the steam outlet 33 to allow venting of steam when the electronic valve 14 is triggered by the user. A button (not shown) located at the handle portion 5 of the steam iron 3 triggers the opening of the electronic valve 14. The steam then passes through the filter unit 7 and exits via an outlet of the filter unit into a second pipe 13, which is connected to the hose 4 via a coupling (not shown). Alternatively, the hose 4 may be directly connected to the outlet of the filter unit 7. The hose 4 conveys the filtered steam to the steam iron (not shown).

As shown in FIG. 4, the first pipe 12 is connected to the steam outlet 33 of the boiler 11 and to the filter unit 7. In particular, the steam outlet 33 is connected to a top part of the boiler 11 such that large particles of scale and other dense or large impurities that are present in the boiler 11 are prevented from entering the first pipe 12 and will be retained in the boiler 11. If contaminated water and steam in the boiler 11 are generating foam then some impurities may be carried over into the first pipe 12 and will be removed by the filter unit 7. However, due to the position of the filter unit 7 in the steam path, spaced from the steam outlet 33 and downstream of the boiler 11, the filter unit 7 will not be blocked by large impurities and will not be affected by the heat within the boiler 11 itself. In particular, if the filter unit 7 were disposed immediately adjacent to the boiler 11, or partially extending through the steam outlet into the boiler 11, then any large scale flakes and foaming may cause the filter unit 7 to become blocked or damaged. The same advantage is realized in the embodiment described with reference to FIG. 1. By moving the filter unit 7 along the steam path, spaced from the steam outlet 33, only relatively clean steam will be conveyed through to the filter unit 7. Larger particles and dense impurities will not be conveyed from the boiler 11 along the steam path, so will be retained in the boiler 11.

Figure 5:
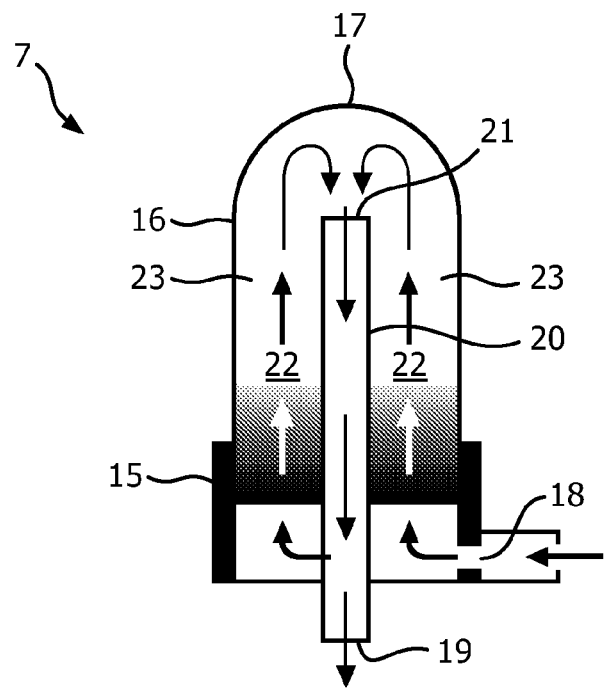
FIG. 5 shows a cross-section of a first embodiment of a filter unit.
Figure 6:
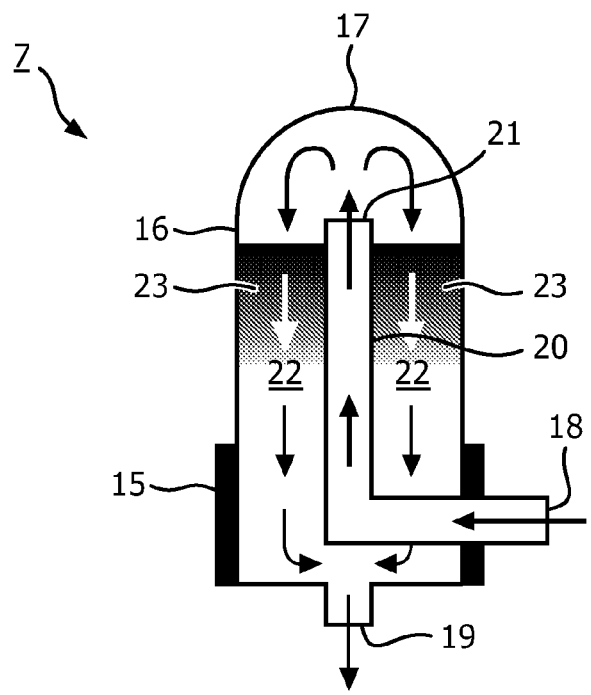
FIG. 6 shows a cross-section of a second embodiment of a filter unit.

FIGS. 5 and 6 show embodiments of the filter unit 7 for the pressurized fabric steamer 1 described with reference to FIGS. 1 to 4. In particular, FIGS. 5 and 6 show cross-sectional views of the filter unit 7.

As shown in FIG. 5, this embodiment of the filter unit 7 comprises a base portion 15 and a housing 16 that extends from the base portion 15 to a remote second end 17, which is at an opposite end of the filter unit 7 to the first end of the base portion 15. The housing 16 is closed and defines an interior space except for an inlet 18 and an outlet 19 which are formed in the base portion 15 of the filter unit 7. In this embodiment, a tube 20 extends from the outlet 19 into the interior space of the housing 16, towards the second end 17. The tube 20 extends from the outlet 19 in the base portion 15, into the housing 16, to an end 21 which is spaced from the second end 17 of the housing 16. The inlet 18 communicates with an annular space 22 which is formed within the interior space of the housing 16, surrounding the tube 20. Therefore, the tube 20 provides a barrier that defines a fluid path that directs steam entering the inlet 18 in the base portion 15 through the annular space 22, towards the second end 17, into the end 21 of the tube 20 and then through the tube 20 to the outlet 19 in the base portion 15. As shown in FIG. 5, a filter medium 23 occupies at least a part of the annular space 22 within the housing 16, around the tube 20, such that the filter medium 23 is disposed between the inlet 18 and the outlet 19 of the filter unit 7 and the steam passes through the filter medium 23 as it flows through the filter unit 7.

FIG. 6 shows another embodiment of the filter unit 7 having a similar construction to the filter unit 7 described with reference to FIG. 5. However, in this embodiment the tube 20 which extends into the housing 16, towards the second end 17, is connected to the inlet 18, with the outlet 19 being formed in the base portion 15 of the filter unit 7. Therefore, in this embodiment, steam enters through the inlet 18 and into the tube 20, flows through the tube 20 to the end 21 of the tube and into the second end 17 of the housing 16, then through the filter medium 23 in the annular space 22 before reaching the outlet 19 in the base portion 15.

In each of the embodiments described with reference to FIGS. 5 and 6 the steam is filtered as it flows through the filter medium 23 which is disposed in the annular space 22 surrounding the tube 20 in the housing 16. Particles and other impurities are removed from the steam as it passes through the filter medium 23. Moreover, any foam that has been carried to the filter unit 7 from the boiler will be removed.

In each of the embodiments described with reference to FIGS. 5 and 6 the housing 16 has a cylindrical shape with a dome-shaped second end 17. However, it will be appreciated that the filter unit 7 may have a different shape, for example it may have a cuboid or pyramidal shaped housing. Furthermore, the second end 17 of the filter unit 7 may not have a domed-shaped profile. The second end 17 may alternatively be square, or a different shape.

Moreover, the filter units 7 described with reference to FIGS. 5 and 6 both have a tube 20 that extends centrally into the housing 16. However, it will be appreciated that the tube 20 may not be positioned centrally within the housing 16, and may alternatively extend along a side of the housing 16, or in any other direction towards the second end 17. In this case, the filter medium 23 will occupy the space in the housing 16 surrounding the tube 20, which may or may not be an annular space as previously described. In other words, the filter medium 23 occupies the space within the housing 16, surrounding the tube 20, regardless of the shape or position of the housing 16 or the tube 20. Moreover, the filter unit 7 may not comprise a tube 20 as shown in FIGS. 5 and 6 but may alternatively comprise a straight wall or other shape barrier that directs steam from the first end of the filter unit 7, where the base portion 15 located, towards the second end 17 of the filter unit 7. In this way, the barrier causes the steam to flow through the filter medium 23 which is disposed intermediate the first and second ends of the filter unit.

Therefore, the filter unit 7 described with reference to FIG. 5 or 6 can be used in any of the embodiments described with reference to FIGS. 1 to 4. In this way, the steam being produced by the boiler will be filtered and cleaned as it flows along the steam path to the soleplate in the steam iron. Steam which reaches the soleplate and exits through the steam vents will be clean and will not impart impurities on the garment being ironed.

In the embodiments described with reference to FIGS. 5 and 6 the filter medium 23 is arranged in the annular space 22 around the tube 20. This means that the cross-sectional area of the filter medium 23 is greater than the cross-sectional area of the tube 20, the inlet 18 and the outlet 19. The filter medium 23 will provide some limitation of the rate at which steam can flow through the filter unit 7. For example, a filter medium having a smaller pore size will limit the flow rate more than a filter medium with larger pore size. Therefore, the large cross-sectional area of the filter medium 23 will help to counteract this limiting effect and maintain a sufficient steam flow rate through the filter unit 7 and through the pressurized fabric steamer while still providing sufficient filtering of the steam. Moreover, the larger cross-sectional area means that the pressure of the steam in the filter medium 23 is reduced, resulting in greater filtration and less abrasion and wear to the filter medium 23.

The filter units 7 described with reference to FIGS. 5 and 6 are attached to the pressurized fabric steamer 1 described with reference to FIGS. 1 to 4. A first part of the steam path conveys steam from the boiler 11 to the filter unit 7 and a second part of the steam path conveys steam from the filter unit 7 to the soleplate 6. The first part of the steam path may comprise the first pipe 12, as described with reference to FIG. 4. Alternatively, if the filter unit 7 is attached to the steam iron, the first part of the steam path may comprise the hose 4 and the pipe 8 within the steam iron. Similarly, the second part of the steam path may comprise the hose 4 and a pipe (not shown) within the steam iron, as described with reference to FIGS. 3 and 4. Alternatively, the second part of the steam path may comprise the passage 9 within the steam iron 3, as described with reference to FIG. 1. In any case, the steam path comprises a first part and second part and the filter unit 7 is disposed intermediate the first and second parts such that the filter unit 7 is spaced from the boiler 11.

As previously described, the filter unit 7 may be attached to the steam iron 3, such that steam is filtered immediately before it reaches the soleplate 6, or the filter unit 7 may be attached to the base unit 2, such that steam is filtered after leaving the boiler 11 and before entering the hose 4. However, it will be appreciated that the filter unit 7 may be disposed anywhere along the steam path between the boiler 11 and the soleplate 6. For example, the hose 4 may be provided with an intermediate body to which the filter unit 7 can be attached.

The housing 16 of the filter unit 7 described with reference to FIGS. 1 to 6 may be at least partially transparent. That is, the filter unit 7 may include a transparent or translucent window or the housing 16 itself may be made from a transparent or translucent material. In this way, a user is able to see the steam moving through the filter unit 7 and is able to see the filter medium 23 within the filter unit 7. In this way, a user is able to see the color of the filter medium 23 and it will be apparent when the filter medium 23 needs to be replaced or cleaned. In particular, the second end 17 of the filter unit 7 housing 16 may be transparent or translucent so that a user can see the steam and/or the filter medium 23 through the second end 17 of the filter unit 7. The housing 16 of the filter unit 7 may be made from a transparent polycarbonate material, or any other transparent or translucent polymer or other transparent or translucent material.

As steam flows through the filter unit 7, impurities are removed from the steam and are retained in the filter medium 23. Therefore, over time, the color of the filter medium 23 will change as more impurities accumulate. In the embodiments described with reference to FIGS. 5 and 6 the user is able to see the filter medium 23 through the transparent part of the housing 16 and when the filter medium 23 changes color and particles are visible the filter medium 23, a part of the filter unit 7, or the entire filter unit 7, can be changed or replaced. In the embodiment described with reference to FIG. 5, the steam passes through the filter medium 23 before reaching the second end 17 of the filter unit 7, where it enters the tube 20 and flows to the outlet 19. Therefore, in an embodiment when the second end 17 of the housing is transparent a user is able to see the color of the steam which is flowing to the outlet 19 of the filter unit 7.

In the example filter unit 7 described with reference to FIG. 6, if the housing 16 of the filter unit 7 is transparent, a user is able to see the steam as it enters the filter unit 7 and is also able to see the filter medium 23. Therefore, the user is able to monitor the color and condition of the filter medium 23 and judge when the filter medium 23, a part of the filter unit 7 or the whole filter unit 7 should be replaced.

Therefore, as described above, a user is able to monitor the color and condition of the filtered steam as well as the color and condition of the filter medium 23, resulting in better judgment of the need to change the filter medium 23 without having to disconnect any parts.

In the embodiment described with reference to FIGS. 1 and 2, with the filter unit 7 disposed on a front part of the handle portion 5 of the steam iron 3, a user is able to see the filter medium 23, and possibly the filtered steam, while holding and using the steam iron 3. Therefore, the user is able to monitor the color and condition of the filter medium 23 and will be able to judge when the filter medium 23 needs to be cleaned or replaced.

In the embodiment described with reference to FIGS. 3 and 4, a user will be able to monitor the color and condition of the filter medium 23 by viewing the filter unit 7 protruding from the body 10 of the base unit 2.

Figure 7:
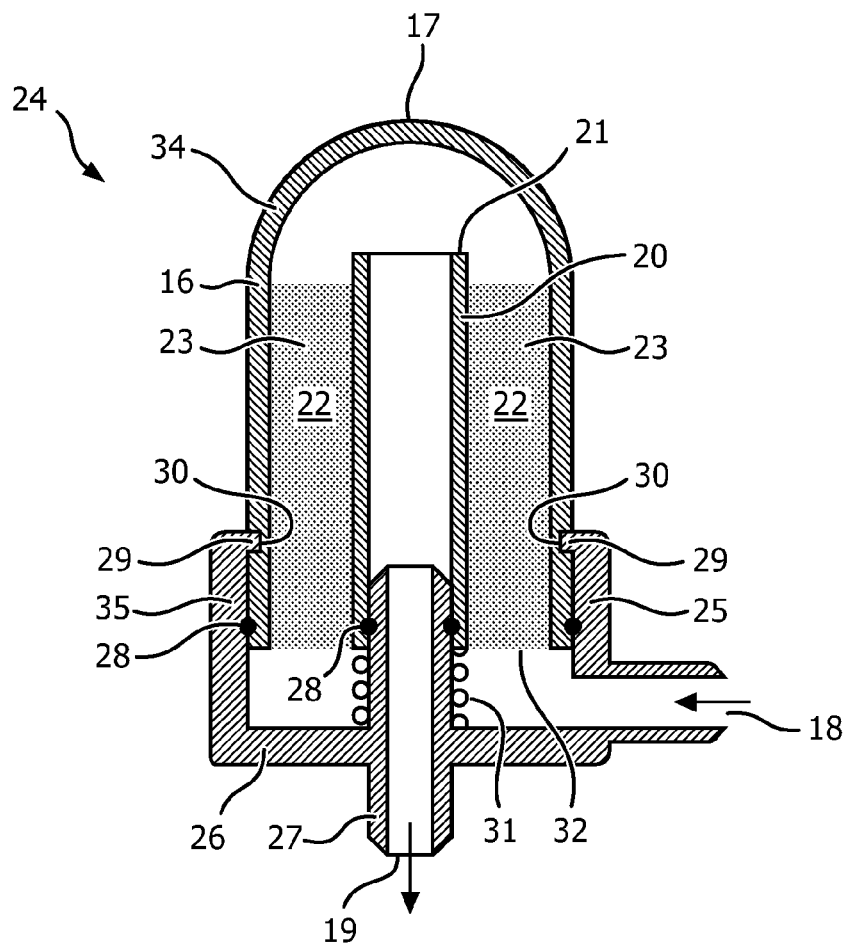
FIG. 7 shows a cross-section of a removable filter unit.

FIG. 7 shows an embodiment of a filter unit 7 with a similar structure to the embodiments described with reference to FIGS. 5 and 6. In this embodiment, the filter unit 7 has a removable filter cartridge 24 that allows a user to easily change the filter medium 23, as explained hereinafter.

In this embodiment, the filter unit 7 has a cartridge mount 35 which is retained on a part of the pressurized fabric steamer 1, and the removable filter cartridge 24, which includes a cartridge housing 34 containing the filter medium 23, is removably attachable to the cartridge mount 35. In this way, the filter cartridge 24, or the filter medium 23 within the filter cartridge 24, can easily be replaced or cleaned. It will be noted that the base portion 15 and housing 16 of the embodiments of filter units 7 described with reference to FIGS. 5 and 6 have been separated into a cartridge mount 35 and cartridge housing 34.

As shown in FIG. 7, the cartridge mount 35 of the filter unit 7 is configured in the same manner as the base portion 15 of the filter unit 7 described with reference to FIG. 5. In particular, the inlet 18 is formed in a side wall 25 of the cartridge mount 35 and is connected to the annular space 22 surrounding the tube 20 which in this case is disposed within the cartridge housing 34.

The cartridge mount 35 has a bottom wall 26 and a cylindrical side wall 25 and the outlet 19 is formed in an outlet tube 27 which extends centrally through the bottom wall 26 of the cartridge mount 35. The outlet tube 27 also extends partly towards the second end 17 of the filter unit 7. The filter cartridge 24 comprises a cylindrical cartridge housing 34 and a centrally extending tube 20 which is similar to the tube 20 described with reference to FIGS. 5 and 6. Therefore, the filter cartridge 24 comprises a first end having a cartridge inlet and a cartridge outlet. In this case, the cartridge outlet is formed in the tube 20 and the cartridge inlet comprises the annular space surrounding the tube 20 within the cartridge housing 34. When the filter cartridge 24 is received in the cartridge mount 35 one end of the tube 20 is connected to the outlet tube 27. The other end 21 of the tube 20 is spaced from the second end 17 of the cartridge housing 34 in the manner described with reference to FIGS. 5 and 6.

As shown in FIG. 7, when the filter cartridge 24 is received in the cartridge mount 35 the outer surface of the cylindrical cartridge housing 34 is received against the cylindrical side wall 25 of the cartridge mount 35, with the outlet tube 27 being received within the tube 20 in the cartridge housing 34. The filter medium 23 is disposed within the cartridge housing 34, in the annular space 22 surrounding the tube 20. Therefore, when assembled, the filter unit 7 of FIG. 7 will work in the same manner as the filter unit 7 described with reference to FIG. 5.

In an alternative embodiment, the removable filter unit 7 may be configured in the manner described with reference to FIG. 6, with the tube 20 in the cartridge housing 34 being connected to an inlet 18, rather than the outlet 19 as described above. In this case, the outlet 19 will be formed in the cartridge mount 35 and will communicate with the annular space 22 around the tube 20.

As shown in FIG. 7, the cartridge mount 35 and the filter cartridge 24 may comprise sealing elements 28 positioned between the outlet tube 27 and the tube 20 in the cartridge housing 34, and between the side wall 25 of the cartridge mount 35 and the cartridge housing 34 of the filter cartridge 24. In this way, when the filter cartridge 24 is received in the cartridge mount 35, the sealing elements 28 act to seal the filter unit 7. The sealing elements 28 may be a rubber seal, such as an 'O' ring or a lip seal. Additionally, the sealing elements 28 may provide a retaining force to hold the filter cartridge 24 in the cartridge mount 35.

Moreover, the removable cartridge housing 34 may not comprise a tube 20 as shown in FIGS. 5 and 6 but may alternatively comprise a straight wall or other shape barrier that directs steam from the first end of the filter unit 7, where the cartridge mount 35 is located, towards the second end 17 of the filter unit 7 in the cartridge housing 34. In this way, the barrier causes the steam to flow through the filter medium 23 which is disposed intermediate the first and second ends of the filter unit.

Figure 8:
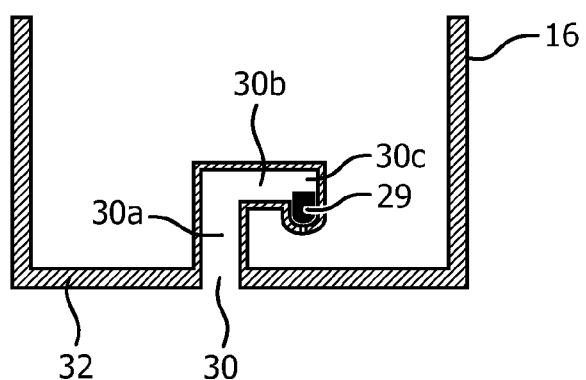
FIG. 8 shows a schematic cross-section of the attachment means for the removable filter unit of FIG. 7.

Alternatively or additionally, as shown in FIGS. 7 and 8, the filter cartridge 24 and cartridge mount 35 may have an interlocking system that retains the filter cartridge 24 in the cartridge mount 35. FIG. 8 shows a schematic diagram of the interlocking system.

As shown in FIGS. 7 and 8, the filter cartridge 24 and cartridge mount 35 are cylindrical with the filter cartridge 24 being received within the cylindrical side wall 25 of the cartridge mount 35 in an interlocking manner so that the filter cartridge 24 can easily be attached to and removed from the cartridge mount 35. The inside face of the side wall 25 of the cartridge mount 35 may comprise a protrusion 29 and the outside face of the cartridge housing 34 may comprise a recess 30 and the protrusion 29 and recess 30 may interlock to attach the filter cartridge 24 to the cartridge mount 35. Moreover, as shown in FIG. 7, a resilient member 31, such as a compression spring, may be disposed in the cartridge mount 35 and arranged to act against the filter cartridge 24, pushing the filter cartridge 24 away from the cartridge mount 35. In this case, the compression spring 31 is disposed around the outlet tube 27 formed in the cartridge mount 35, such that it acts against a bottom face of the tube 20 in the cartridge housing 34 when the filter cartridge 24 is received in the cartridge mount 35.

As shown in FIG. 8, the recess 30 in the cartridge housing 34 may comprise three portions which the protrusion 29 of the filter cartridge 24 engages with to form the interlocking system: a first portion 30a that extends from the bottom edge 32 of the cartridge housing 34 in a longitudinal direction, in the direction that the filter cartridge 24 is inserted into the cartridge mount 35; a second portion 30b that extends circumferentially around the housing 34 in a direction perpendicular to the first portion 30a; and, a third portion 30c which extends parallel to the first portion 30a, partially back towards the bottom edge 32 of the housing 34. It will be appreciated that the recess 30 on the cartridge housing 34 does not extend through the wall of the cartridge housing 34, so that the seal of the filter unit 7 is maintained.

In this way, the filter cartridge 24 can be inserted into and attached to the cartridge mount 35 by: aligning the protrusion 29 of the cartridge mount 35 with the first part 30a of the recess; pushing down, against the force of the compression spring 31 until the protrusion 29 reaches the join between the first portion 30a and the second portion 30b of the recess 30; twisting the filter cartridge 24 such that the protrusion 29 moves along the second portion 30b to the join with the third portion 30c; and, releasing the filter cartridge 24 such that the spring 31 pushes the filter cartridge 24 away from the cartridge mount 35 and the protrusion 29 on the cartridge mount 35 engages the end of the third portion 30c of the recess 30 on the cartridge housing 34.

In this position, the compression spring 31 remains under some deformation so that the spring 31 is acting to push the filter cartridge 24 away from the cartridge mount 35 while the protrusion 29 is engaged with the end of the third portion 30c of the recess 30 to retain the filter cartridge 24 on the cartridge mount 35. A user is able to remove the filter cartridge 24 by pushing down on the filter cartridge 24 then rotating the filter cartridge 24 to align the protrusion 29 with the first portion 30a of the recess 30 and thereby disengage the protrusion 29 and recess 30.

It will be appreciated that the filter cartridge 24 and cartridge mount 35 may comprise multiple protrusions 29 and recesses 30 disposed around the filter unit 7 so that the filter cartridge 24 is better retained on the cartridge mount 35. Moreover, multiple, evenly distributed recesses 30 and protrusions 29 will act to hold the filter cartridge 24 in a square position, with the tube 20 in the cartridge housing 34 being parallel to the outlet tube 27, and to prevent the filter cartridge 24 from twisting or leaning under the force of the spring 31, thereby better maintaining the seal between the filter cartridge 24 and the cartridge mount 35.

In the example described with reference to FIGS. 7 and 8, the filter cartridge 24 comprises a recess 30 which engages with the protrusion 29 of the cartridge mount 35. The protrusion 29 and recess 30 act as a connector between the filter cartridge 24 and the cartridge mount 35 and it will be appreciated that other connectors for removably connecting the filter cartridge 24 to the cartridge mount 35 may be used. For example, a finger clip or fastener may be used. Alternatively, the filter cartridge 24 and the cartridge mount 35 may comprise cooperating threaded elements such that the filter cartridge 24 can be threadingly connected to the cartridge mount 35. Alternatively, the filter cartridge 24 and the cartridge mount 35 may be connected by means of a push-fit.

The filter medium 23 of the filter unit 7 may be made from a polymer foam material, but is preferably made from stainless steel fiber, plastic or plant fibers. Alternatively, the filter medium 23 may be made from a metal lattice, for example a stainless steel lattice. Alternatively, any other type of porous material may be used as the filter medium 23. The filter medium 23 may be selected for the maximum size of its pores—the maximum size of particle that can pass through the filter. For example, the maximum pore size of the filter medium 23 may be between 50 µm and 300 µm. In a preferred embodiment, the maximum pore size of the filter medium 23 is between 100 µm and 200 µm.

Furthermore, the filter medium 23 may comprise more than one different material, or multiple layers of the same material. For example, the filter medium 23 may comprise foam having a relatively large pore size positioned upstream and a foam having a smaller pore size positioned downstream, such that different size particles are separated at different stages of the filter medium 23. Moreover, the filter medium 23 may include a stainless steel mesh at the upstream end, such that the largest particles are prevented from reaching a foam filter material further downstream, thereby protecting the foam filter material from abrasion and blockages caused by the larger particles.

As previously described, the steam being conveyed along the steam path is pressurized and this will push the steam through the filter medium 23. Therefore, a denser filter medium 23 with smaller pore size can be used to remove more impurities from the steam without causing a detrimental reduction in the flow rate of steam through the pressurized fabric steamer. Moreover, the greater cross-sectional area of the filter medium 23, compared to other parts of the steam path, means that the pressure of the steam within the filter medium 23 is reduced and the flow rate can more easily be achieved without subjecting the filter medium 23 to relatively high pressures or high fluid speeds, which may damage the filter medium 23 and/or reduce the effectiveness of the filtering. This means that the filter medium 23 will last longer and will more effectively filter impurities from the steam.

In each of the above described embodiments of a pressurized fabric steamer, the filter unit is located downstream of the boiler where the steam is produced. In other words, the filter unit 7 is spaced from the steam outlet 33 of the boiler 11 (see FIG. 4). In this way, there is some conveyance of steam out of the boiler and along a portion of the steam path before the steam enters the filter unit. Although this is not an essential feature of the invention, this helps to maintain the operational life of the filter and the filter will not be exposed to the high temperatures, pressure, foam, boiling water, large particles and other features of the steam generating boiler that may damage or block the filter.

The filter unit in the embodiments of pressurized fabric steamers described above ensures the steam that reaches the soleplate is sufficiently clean to be imparted on a garment without staining or damaging that garment. In particular, impurities that are being carried with the steam, or impurities that are dissolved in any water flowing along the steam path, are removed and retained in the filter medium.

It will be appreciated that the pressurized fabric steamer described with reference to the Figures, having a base unit and a steam iron, is merely an example and the invention as defined in the claims may alternatively comprise any kind of apparatus for applying the steam. For example, the hose may convey steam from a boiler to an outlet on a steamer head having a plurality of steam vents for imparting steam onto articles, such as curtains or upholstery. The apparatus for applying steam will comprise some means of applying the steam to an article via steam vents, which is the final point in the steam path. For example, in the above described steam iron embodiment the steam iron is the apparatus for applying steam and the soleplate comprises one or more steam vents.

It will be appreciated that the term "comprising" does not exclude other elements or steps and that the indefinite article "a" or "an" does not exclude a plurality. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claimed in any claim and whether or not it mitigates any or all of the same technical problems as does the parent invention. The applicants hereby give notice that new claims may be formulated to such features and combinations of features during the prosecution of the present application or of any further application derived therefrom.

The invention claimed is:

1. A steamer comprising:
   a steam generator with a steam outlet;
   a steam path extending from the steam outlet to convey steam;
   a filter unit in the steam path, wherein the filter unit comprises a filter cartridge removably mounted along the steam path having a cartridge housing, a filter medium received in the cartridge housing, a cartridge inlet and a cartridge outlet which are at or towards a first end of the cartridge housing, and a barrier configured to guide the steam to flow in the cartridge housing to a second end, the filter unit being spaced from the steam outlet to filter impurities from steam passing through the filter medium as the steam travels along the steam path; and
   a base unit and a head unit having one or more steam vents for supplying steam to a surface to be steamed, and
   wherein the filter unit is on the base unit.

2. The steamer of claim 1, wherein the filter unit comprises a cartridge mount configured to mount the filter cartridge in the steam path.

3. The steamer of claim 1, wherein the filter medium is disposed between the first end and the second end of the cartridge housing.

4. The steamer of claim 1, wherein the barrier is a tube extending in the cartridge housing which is configured to fluidly connect the cartridge inlet or cartridge outlet with the second end of the cartridge housing.

5. The steamer of claim 1, wherein the filter medium is spaced from the cartridge inlet.

6. The steamer of claim 1, wherein the cartridge housing is transparent or translucent.

7. The steamer of claim 1, further comprising:
   a body, wherein the cartridge housing is removably attachable to the body such that it extends from the body.

8. The steamer of claim 1, further comprising a filter unit on the head unit.

9. The steamer of claim 1, wherein the head unit is a steam iron having a soleplate that comprises the one or more steam vents.

10. A filter cartridge for a steamer, the filter cartridge comprising:
    a cartridge housing;
    a connector for mounting the filter cartridge along a steam path of said steamer;
    a filter medium in the cartridge housing to filter impurities from steam passing through the filter medium as the steam travels along said steam path;
    a cartridge inlet and a cartridge outlet which are at or towards a first end of the cartridge housing; and
    a barrier configured to guide the steam to flow in the cartridge housing to a second end,
    wherein the steamer comprises a base unit and a head unit having one or more steam vents for supplying steam to surface to be steamed, and
    wherein the filter cartridge is on the base unit.

11. A method of conveying steam with a steamer, the method comprising the steps of:
    directing steam from a steam outlet of the steamer and along a steam path to a filter cartridge removably mounted along the steam path, wherein the filter cartridge comprises a cartridge housing, a filter medium received in the cartridge housing, a cartridge inlet and a cartridge outlet which are at or towards a first end of the cartridge housing; and
    filtering impurities from steam passing through the filter medium as the steam passes along the steam path at a position in the steam path that is spaced from the steam outlet, the steam being guided via a barrier, in the cartridge housing to flow in the cartridge housing to a second end,
    wherein the steamer comprises a base unit and a head unit having one or more steam vents for supplying steam to a surface to be steamed, and
    wherein the filter cartridge is on the base unit.

12. The steamer of claim 1, wherein the filter medium has a maximum pore size adapted to filter impurities from steam passing through the filter medium.

13. The steamer of claim 12, wherein the maximum pore size of the filter medium is between 50 micrometers and 300 micrometers.

* * * * *